(12) United States Patent
Tian

(10) Patent No.: US 10,545,531 B2
(45) Date of Patent: Jan. 28, 2020

(54) ELECTRONIC DEVICE

(71) Applicants: BOE Technology Group Co., Ltd., Beijing (CN); Beijing BOE Optoelectronics Technology Co., Ltd., Beijing (CN)

(72) Inventor: Wenhong Tian, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 47 days.

(21) Appl. No.: 15/749,280

(22) PCT Filed: Aug. 17, 2017

(86) PCT No.: PCT/CN2017/097747
§ 371 (c)(1),
(2) Date: Jan. 31, 2018

(87) PCT Pub. No.: WO2018/126695
PCT Pub. Date: Jul. 12, 2018

(65) Prior Publication Data
US 2019/0018447 A1 Jan. 17, 2019

(30) Foreign Application Priority Data
Jan. 3, 2017 (CN) .................... 2017 2 0002117 U

(51) Int. Cl.
*G06F 1/16* (2006.01)
*H04R 1/08* (2006.01)
*H04R 1/04* (2006.01)

(52) U.S. Cl.
CPC .......... *G06F 1/1605* (2013.01); *G06F 1/1684* (2013.01); *H04R 1/04* (2013.01); *H04R 1/083* (2013.01)

(58) Field of Classification Search
CPC ........ G06F 1/16; G06F 1/1605; G06F 1/1684; G06F 3/16; H04R 1/04; H04R 1/083;
(Continued)

(56) References Cited

U.S. PATENT DOCUMENTS 8,812,140 B2 * 8/2014 Huang ................ H04M 1/7253
455/149
2002/0148625 A1 * 10/2002 Darling .................. H01Q 1/245
174/363
(Continued)

FOREIGN PATENT DOCUMENTS

| CN | 106131260 A | 11/2016 |
|---|---|---|
| CN | 206301258 U | 7/2017 |
| WO | 2014205078 A3 | 10/2015 |

OTHER PUBLICATIONS

Nov. 16, 2017—(WO) International Search Report and Written Opinion Appn PCT/CN2017/097747 with English Tran.

*Primary Examiner* — Dimary S Lopez Cruz
*Assistant Examiner* — Ingrid D Wright
(74) *Attorney, Agent, or Firm* — Banner & Witcoff, Ltd.

(57) ABSTRACT

An electronic device. The electronic device includes: a microphone module, a data input/output interface module, and a sound transmission channel. The data input/output interface module includes an input/output interface jack. The sound transmission channel includes a first port and a second port, the first port meets the input/output interface jack, and the second port meets the microphone module.

19 Claims, 6 Drawing Sheets

(58) Field of Classification Search
CPC .. H04R 19/04; H04M 1/0216; H04M 1/0222; H04M 1/0268
See application file for complete search history.

(56) References Cited

U.S. PATENT DOCUMENTS

| | | | | |
|---|---|---|---|---|
| 2003/0021425 | A1* | 1/2003 | Cheng | H04R 19/01 381/71.7 |
| 2008/0013758 | A1* | 1/2008 | Tsai | H04R 1/406 381/122 |
| 2011/0019860 | A1* | 1/2011 | Birch | H04M 1/05 381/375 |
| 2012/0218723 | A1* | 8/2012 | Kwak | H01Q 1/243 361/748 |
| 2012/0270610 | A1* | 10/2012 | Chang | H04M 1/026 455/569.1 |
| 2013/0260617 | A1* | 10/2013 | Wang | H04M 1/02 439/682 |
| 2014/0065890 | A1* | 3/2014 | Cheng | H04M 1/03 439/668 |
| 2014/0193019 | A1* | 7/2014 | Yan | H04R 1/30 381/342 |
| 2015/0027802 | A1* | 1/2015 | Altschul | A45C 11/00 181/177 |
| 2015/0086064 | A1* | 3/2015 | Froemel | G06F 13/4081 381/394 |
| 2017/0126862 | A1* | 5/2017 | Evans, V | H04M 1/0249 |

* cited by examiner

ELECTRONIC DEVICE

The application is a U.S. National Phase Entry of International Application No. PCT/CN2017/097747 filed on Aug. 17, 2017, designating the United States of America and claiming priority to Chinese Patent Application No. 201720002117.2, filed Jan. 3, 2017. The present application claims priority to and the benefit of the above-identified applications and the above-identified applications are incorporated by reference herein in their entirety.

TECHNICAL FIELD

Embodiments of the present disclosure relate to an electronic device.

BACKGROUND

In electronic devices such as mobile phones, tablet computers and notebook computers, microphones are usually included. A sound transmission channel of a microphone on an electronic device is usually disposed separately. A small hole provided in a casing of the electronic device can be used as the sound transmission channel of the microphone, and the small hole exposed on the casing affects aesthetics of the whole appearance of the electronic device product. In addition, a process to produce the sound transmission channel separately in the casing of the electronic device can incur an extra manufacturing cost of the electronic device.

SUMMARY

At least one embodiment of the present disclosure provides an electronic device, and the electronic device comprises: a microphone module, a data input/output interface module, and a sound transmission channel. The data input/output interface module comprises an input/output interface jack; the sound transmission channel comprises a first port and a second port, the first port meets the input/output interface jack, and the second port meets the microphone module.

For example, in the electronic device provided by an embodiment of the present disclosure, the data input/output interface module further comprises a plastic part, and the sound transmission channel is located in the plastic part of the data input/output interface module.

For example, in the electronic device provided by an embodiment of the present disclosure, the first port of the sound transmission channel is disposed on a side wall of the input/output interface jack.

For example, the electronic device provided by an embodiment of the present disclosure comprises a plurality of data input/output interface modules and a plurality of sound transmission channels which are in one-to-one correspondence with the plurality of data input/output interface modules, and an input/output interface jack of each of the plurality of data input/output interface modules meets the microphone module through a corresponding sound transmission channel.

For example, in the electronic device provided by an embodiment of the present disclosure, the data input/output interface module further comprises a conductive-shielding shell, the conductive-shielding shell comprises an opening, and the input/output interface jack meets the microphone module through the opening and the sound transmission channel.

For example, in the electronic device provided by an embodiment of the present disclosure, a shape of the sound transmission channel comprises a cylindrical shape or a horn shape.

For example, in the electronic device provided by an embodiment of the present disclosure, the data input/output interface module comprises a universal serial bus module, a high definition multimedia interface module, a digital video interface module, a thunderbolt interface module, a card reader module or a high definition digital display interface module.

For example, the electronic device provided by an embodiment of the present disclosure comprises a plurality of sound transmission channels. A first port of each of the plurality of sound transmission channels meets the input/output interface jack, and a second port of each of the plurality of sound transmission channels meets the microphone module.

For example, in the electronic device provided by an embodiment of the present disclosure, the sound transmission channel is capable of extending in a direction perpendicular or oblique to the input/output interface jack.

For example, in the electronic device provided by an embodiment of the present disclosure, a diameter range of a cross section of the sound transmission channel is 1-2 mm.

For example, in the electronic device provided by an embodiment of the present disclosure, a length of the sound transmission channel is 1-2 mm.

For example, in the electronic device provided by an embodiment of the present disclosure, the microphone module comprises an electret condenser microphone or a micro electro mechanical system microphone.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

FIG. 1b is a across-sectional schematic diagram of the electronic device along a direction of a line A-A' in FIG. 1a;

FIG. 2b is a schematic diagram of a bottom view of the electronic device along a direction of a line B-B' in FIG. 2a;

DETAILED DESCRIPTION

Figure 1A:
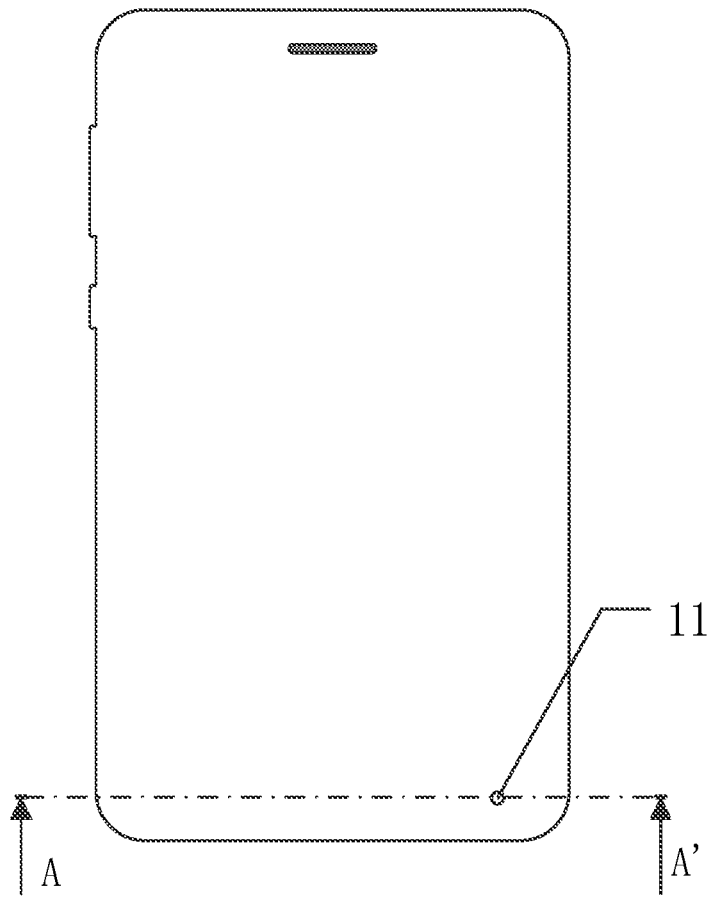
FIG. 1a is a schematic diagram of a front view of an electronic device.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly Each component or structure in the drawings is not drawn in strict accordance with the proportion of rendering. For clarity, the size of each component or structure may be exaggerated or reduced, such as increasing the thickness of the layer, the width of the electrode and etc., but these should not be used to limit the scope of the present disclosure.

Figure 1B:
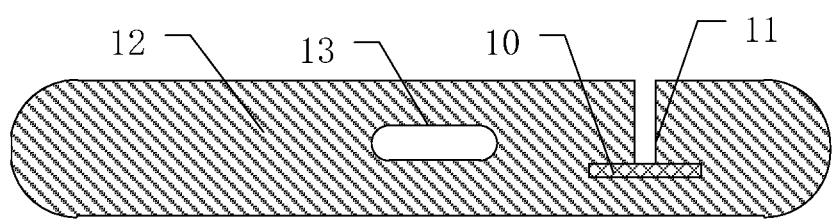
Figure 2A:
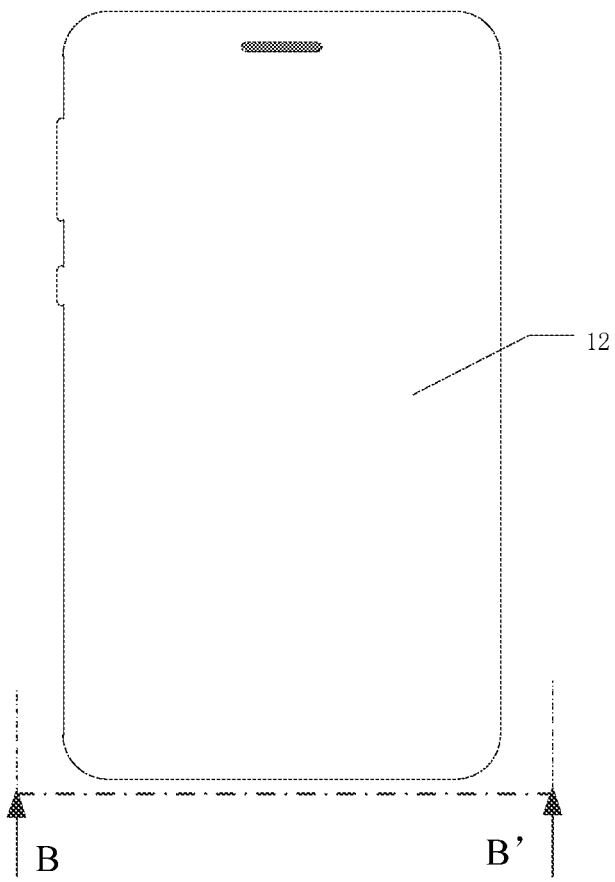
FIG. 2a is a schematic diagram of a front view of another electronic device.
Figure 2B:
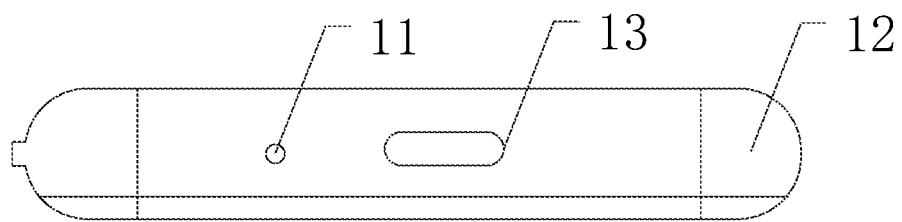

For example, FIG. 1a is a schematic diagram of a front view of an electronic device, FIG. 1b is a cross-sectional schematic diagram of the electronic device along a direction of a line A-A' in FIG. 1a, FIG. 2a is a schematic diagram of a front view of another electronic device, and FIG. 2b is a schematic diagram of a bottom view of the electronic device along a direction of a line B-B' in FIG. 1a.

For example, the electronic device may comprise a casing 12, a microphone sound transmission channel 11, a microphone module 10 and a data input/output interface 13. As shown in FIG. 1a and FIG. 1b, in the electronic device, the microphone sound transmission channel 11 is disposed on a display panel of the electronic device; alternatively, as shown in FIG. 2a and FIG. 2b, the microphone sound transmission channel 11 is disposed on a side surface of a non-working area of the casing 12 of the electronic device; alternatively, the microphone sound transmission channel 11 may also be disposed on other surface(s) of the non-working area of the casing 12. The microphone sound transmission channel 11 is formed by separately producing a small hole in the casing 12, so as to transmit sound to the microphone module 10. The small hole exposed on the display panel or the casing 12 affects the aesthetics of the overall appearance of the electronic device. On the other hand, currently, the small hole of the sound transmission channel is separately produced on the external casing of the electronic device and needs to be processed by a computer numerical control (CNC) machine. A preparation process of the small hole is complicated and a manufacturing cost of the small hole is high.

At least one embodiment of the present disclosure provides an electronic device. The electronic device comprises a microphone module, a data input/output interface module, and a sound transmission channel. The data input/output interface module comprises an input/output interface jack; the sound transmission channel comprises a first port and a second port, the first port meets the input/output interface jack, and the second port meets the microphone module.

In the electronic device, the sound transmission channel of the microphone and the data input/output interface module on the electronic device are integrated together, so that a process of producing the sound transmission channel separately on the casing is omitted, appearance aesthetics of the electronic device is improved, the manufacturing process is simplified, and the production cost is reduced.

Figure 6:
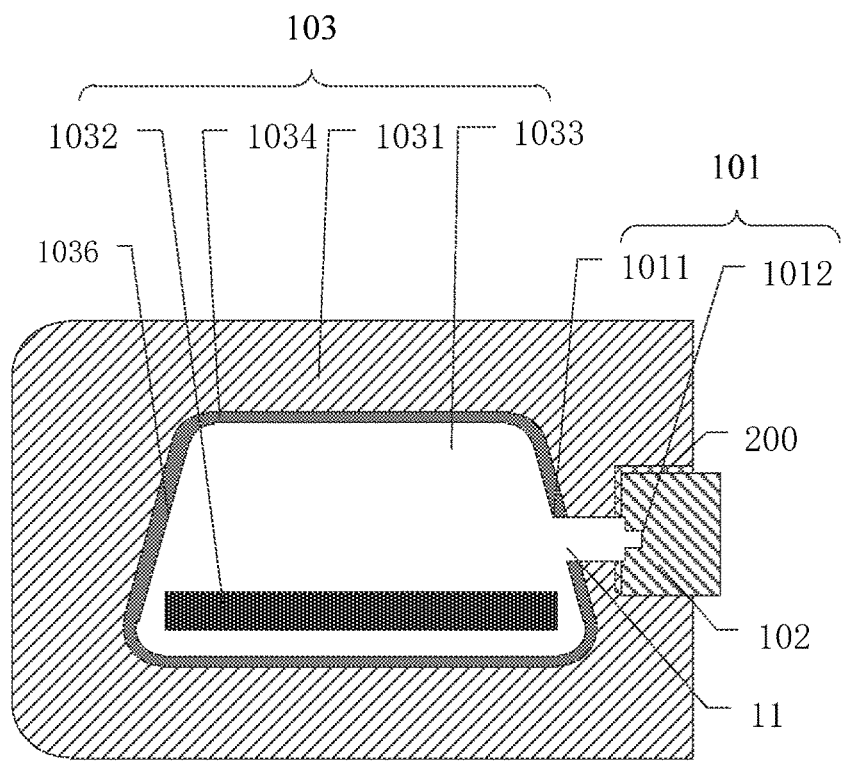
FIG. 6 is a partial structure schematic diagram of an electronic device provided by still another embodiment of the present disclosure.
Figure 7:
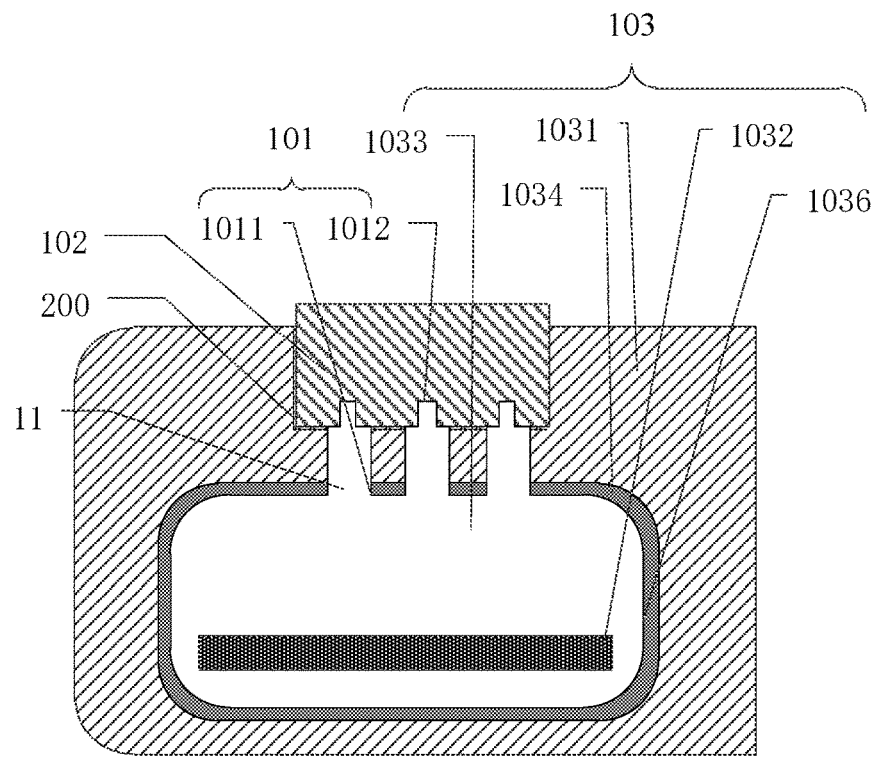
FIG. 7 is a partial structure schematic diagram of an electronic device provided by still yet another embodiment of the present disclosure.
Figure 8:
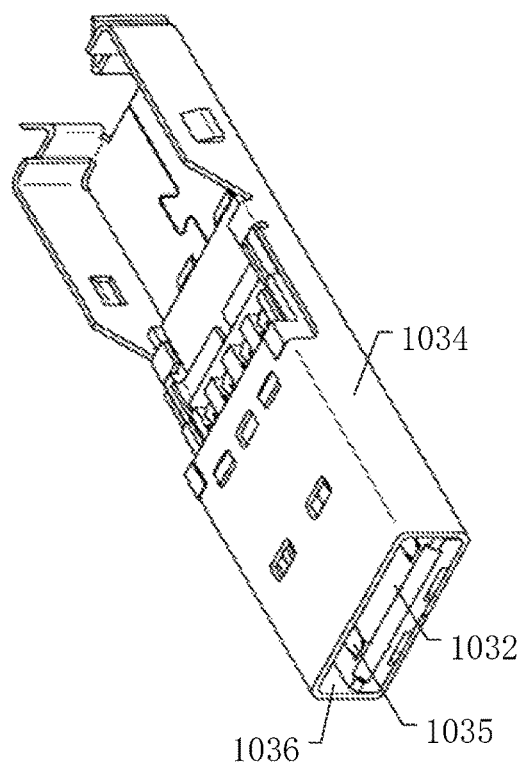
FIG. 8 is a structure schematic diagram of a conductive-shielding shell of a data input/output interface module in an electronic device provided by an embodiment of the present disclosure.

An embodiment of the present disclosure provides an electronic device. For example, FIG. 3, FIG. 4, FIG. 5, FIG. 6, FIG. 7 and FIG. 9 are partial structure schematic diagrams of an electronic device according to different embodiments provided by the present disclosure respectively, and FIG. 8 is a structure schematic diagram of a conductive-shielding shell 1034 of a data input/output interface module 103 in an electronic device provided by an embodiment of the present disclosure.

Figure 3:
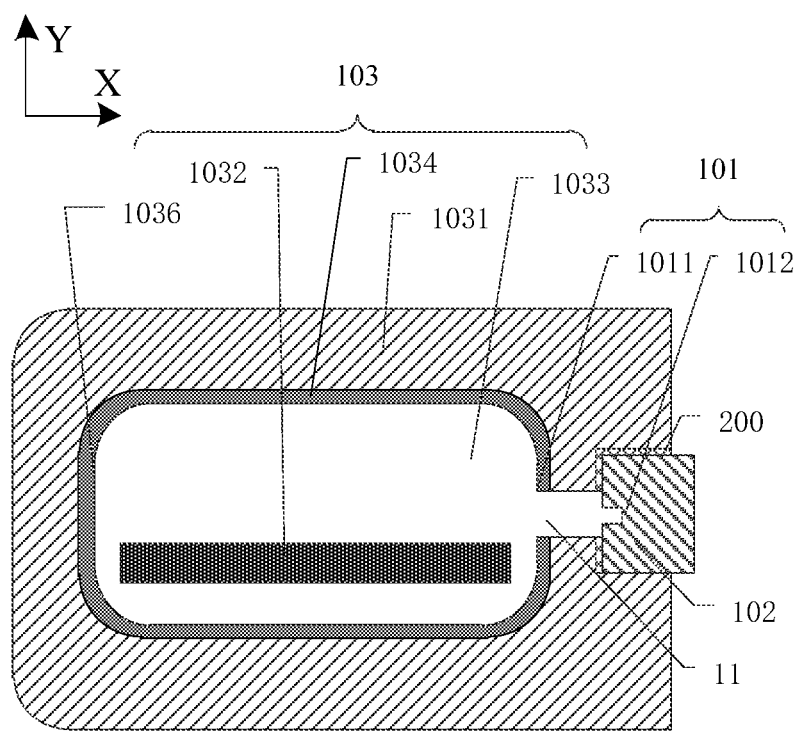
FIG. 3 is a partial structure schematic diagram of an electronic device provided by an embodiment of the present disclosure.

As shown in FIG. 3, the electronic device comprises a microphone module 102, a data input/output interface module 103, and a sound transmission channel 101. The data input/output interface module 103 comprises an input/output interface jack 1033; the sound transmission channel 101 comprises a first port 1011 and a second port 1012, the first port 1011 meets the input/output interface jack 1033, and the second port 1012 meets the microphone module 102.

For example, the electronic device provided by the embodiments of the present disclosure may be various types of electronic devices. The electronic device comprises, for example, a mobile phone, a tablet computer, a digital camera, a watch, a notebook computer, or any device provided with a microphone. According to an embodiment of the present disclosure, sound transmission channels of one or more microphones may be disposed in the data input/output interface module, so that openings for the sound transmission channels do not need to be formed in the casing of the electronic device, and therefore appearance aesthetics of the electronic device can be improved.

For example, the data input/output interface module 103 comprises a universal serial bus (USB) module (such as a micro USB, a mini USB or other types of USB), a high definition multimedia interface (HDMI) module, a digital video interface module, a thunderbolt interface module, a card reader module or an high-definition (HD) digital display interface module, and other interface modules that can transmit data to the electronic device.

For example, the data input/output interface module 103 may further comprise a plastic part 1031 and a conductive metal part (such as pins, wires and the like, which are not shown in the figure). The sound transmission channel 101 is located in the plastic part 1031 of the data input/output interface module 103, so as not to affect normal operation of the data input/output interface module 103.

For example, a filter mesh may be disposed at the second port 1012 of the sound transmission channel 101. The filter mesh can prevent dust, solid impurities and the like from entering into the microphone module 102, and can also improve a sound-receiving effect of the microphone module 102.

For example, the data input/output interface module 103 may further comprise a conductive-shielding shell 1034. The conductive-shielding shell 1034 is provided with an opening 11, and the first port 1011 of the sound transmission channel 1011 can be connected with the input/output interface jack 1033 through the opening 11, so that the input/output interface jack 1033 can be connected with the microphone module 102 through the opening 11 and the sound transmission channel 101.

For example, as shown in FIG. 3 and FIG. 8, in a Y direction, the input/output interface jack 1033 comprises a top surface and a bottom surface which are opposite to each other; in a X direction, the input/output interface jack 1033 comprises two side walls 1036 which are opposite to each other. The top surface and the bottom surface are, for example, parallel to a plane where a docking platform 1032 is located. The side walls 1036 are not parallel to the plane where the docking platform 1032 is located. For example, as shown in FIG. 3, the side walls 1036 and the plane where the docking platform 1032 is located are perpendicular to each other; alternatively, as shown in FIG. 6, the side walls 1036 are inclined to the plane where the docking platform 1032 is located. The first port 1011 of the sound transmission channel 101 can be located on at least one of the side walls 1036. The sound transmission channel 101 may extend in a direction perpendicular to or oblique to the side walls 1036. The side walls 1036 of the input/output interface jack 1033 are not provided with signal contact point(s); alternatively, the side walls 1036 of the input/output interface jack 1033 are only provided with a ground (GND) electrode coating. Therefore, the sound transmission channel 101 does not affect the data transmission of the data input/output interface module 103. In addition, a shape and a quantity of the sound transmission channels 101 may also be not limited thereto. Thus, design of the electronic device provided by the present disclosure is simple, and the manufacture process is simple and convenient.

For example, as shown in FIG. 8, the data input/output interface module 103 further comprises a docking platform 1032 and a signal contact point 1035 which are disposed in the conductive-shielding shell 1034. The signal contact point 1035 is disposed on the docking platform 1032. In a case that a data plug, such as a USB plug, is inserted into the data input/output interface module 103, a signal line on the data plug performs data communication with the electronic device through the signal contact point 1035. For example, when no data plug is inserted, a work state of the microphone module is better.

In the above examples, when the microphone module 102 receives a sound, the sound enters into the microphone module 102 through the input/output interface jack 1033, the opening 11 on the conductive-shielding shell 1034 and the sound transmission channel 101 disposed in the plastic part 1031 in sequence, so as to achieve receipt of the sound.

For example, the sound transmission channel 101 may extend in a direction perpendicular to or oblique to the input/output interface jack 1033. As shown in FIG. 3, the sound transmission channel 101 extends to the microphone module 102 in a direction perpendicular to an extension axis of the input/output interface jack 1033. In an embodiment shown in FIG. 4, the sound transmission channel 101 extends to the microphone module 102 in the direction oblique to the extension axis of the input/output interface jack 1033.

Figure 4:
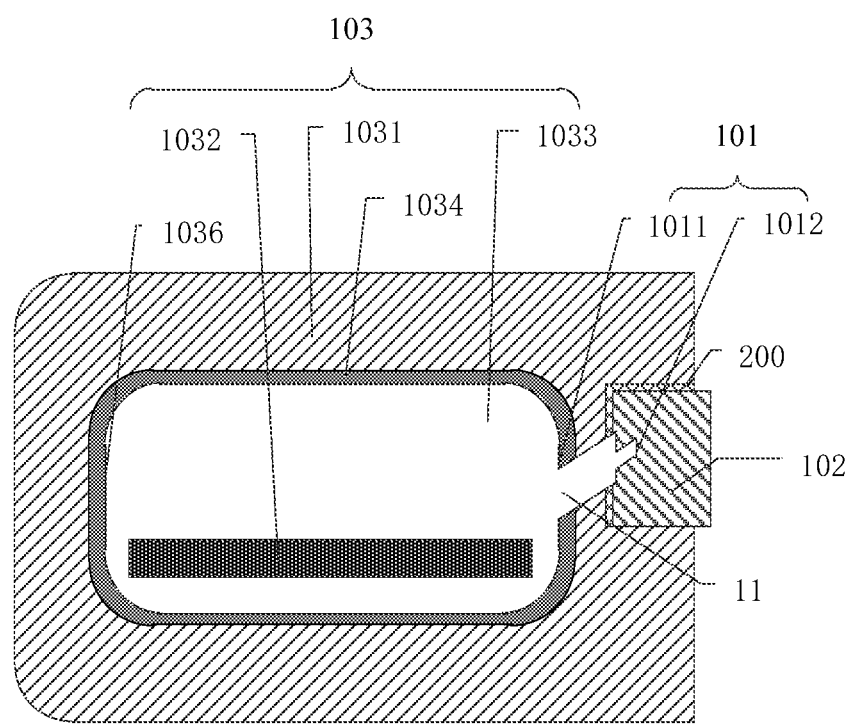
FIG. 4 is a partial structure schematic diagram of an electronic device provided by another embodiment of the present disclosure.

For example, the shape of the sound transmission channel 101 comprises a relatively smooth channel shape such as a cylindrical shape or a horn shape, so as to improve the sound-receiving quality of the microphone module 102. As shown in FIG. 3 and FIG. 4, the shape of the sound transmission channel 101 is a cylindrical shape. In an embodiment shown in FIG. 5, the shape of the sound transmission channel 101 is a horn shape, and the first port 1011 of the sound transmission channel 101 is a larger port in the horn shape, the second port 1012 is a smaller port in the horn shape. The larger port in the horn shape can better receive sound propagating in all directions, so that the sound-receiving effect of the microphone module 102 is better.

Figure 9:
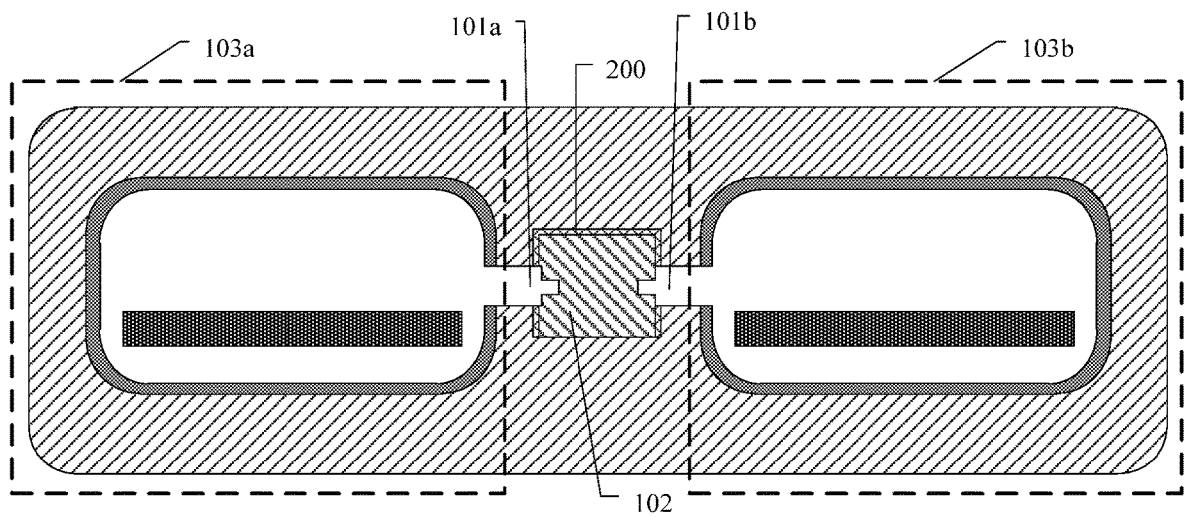
FIG. 9 is a partial structure schematic diagram of an electronic device provided by yet another embodiment of the present disclosure.

For example, the electronic device may comprise a plurality of data input/output interface modules 103, and a plurality of sound transmission channels 101 which are in one-to-one correspondence with the plurality of data input/output interface modules 103. A corresponding input/output interface jack 1033 of each data input/output interface module 103 meets the same microphone module 102 through a respective sound transmission channel 101. For example, as shown in FIG. 9, the electronic device comprises a first data input/output interface module 103a, a second data input/output interface module 103b, a first sound transmission channel 101a and a second sound transmission channel 101b. The first sound transmission channel 101a corresponds to the first data input/output interface module 103a, and the second sound transmission channel 101b corresponds to the second data input/output interface module 103b. The first sound transmission channel 101a and the second sound transmission channel 101b are both connected with the same microphone module 102.

For example, in a case that a data plug is inserted into the first data input/output interface module 103a, the sound can be transmitted to the microphone module 102 to achieve receipt of the sound through the second sound transmission channel 101b; alternatively, when a data plug is inserted into the second data input/output interface module 103b, the sound can be transmitted to the microphone module 102 to achieve receipt of the sound through the first sound transmission channel 101a. Meanwhile, when no data plug is inserted into the first data input/output interface module 103a and the second data input/output interface module 103b, the sound can be transmitted to the microphone module 102 through the first sound transmission channel 101a and the second sound transmission channel 101b at the same time, so as to improve the sound-receiving effect of the microphone module 102.

It should be noted that, the plurality of sound transmission channels 101 corresponding to the plurality of data input/output interface modules 103 may also be respectively connected with different microphone modules 102, which is not limited in the present disclosure.

For example, shapes, functions and the like of the plurality of data input/output interface modules 103 may be the same or different. The plurality of data input/output interface modules 103, for example, may be USB modules, which is not limited in the present disclosure.

For example, shapes, structures and the like of the first sound transmission channel 101a and the second sound transmission channel 101b may be the same or different. As shown in FIG. 9, in an example, the shapes of the first sound transmission channel 101a and the second sound transmission channel 101b are the same, and the first sound transmission channel 101a and the second sound transmission channel 101b extend in a direction perpendicular to the extension axis of the input/output interface jack 1033.

For example, in a case that a cross section of the sound transmission channel 101 is circular, and a diameter of the cross section of the sound transmission channel 101 may be larger than 1 mm. Furthermore, considering the size of the data input/output interface module 103, a diameter range of the cross section of the sound transmission channel 101 may be 1-2 mm.

For example, a channel length of the sound transmission channel 101 may be 1-2 mm.

For example, the microphone module 102 may be various types of microphones. The microphone module 102, for example, may be an electret condenser microphone, a micro electro mechanical system microphone or the like. The microphone module 102 may convert a sound signal into an electrical signal, and transmit the converted electrical signal to other members of the electronic device through a wire or the like.

Figure 5:
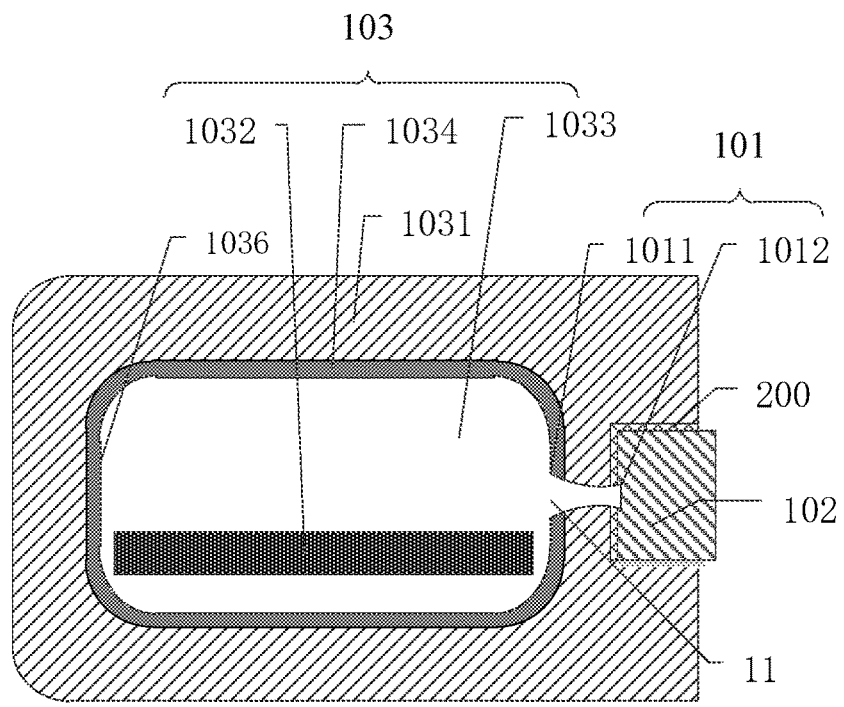
FIG. 5 is a partial structure schematic diagram of an electronic device provided by yet another embodiment of the present disclosure.

For example, a cross section shape of the input/output interface jack 1033 may be a rectangle, a trapezoid, or the like. As shown in FIG. 3 to FIG. 5, the cross section shape of the input/output interface jack 1033 is a rectangle. In the embodiment shown in FIG. 6, the cross section shape of the input/output interface jack 1033 is a trapezoid.

For example, as shown in FIG. 3 to FIG. 6, the microphone module 102 may be adhered to the plastic part 1031 of the data input/output interface module 103 by adhesive 200, so as to prevent the microphone module 102 from swaying around to cause noise. However, the present disclosure is not limited thereto, and the microphone module 102 may also be soldered to the plastic part 1031 of the data input/output interface module 103. The embodiments of the present disclosure do not limit a specific manner of fixing the microphone module 102 and the data input/output interface module 103. For example, the microphone module 102 may be disposed in the plastic part 1031 in a sealing approach, so as to ensure that the sound can completely enter into the microphone module 102 through the sound transmission channel 101, to prevent the sound from leaking from a gap between the microphone module 102 and the plastic part 1031, and to improve the sound-receiving quality of the microphone module 102. The data input/output interface module 103 and the microphone module 102 form an integrated and modular electronic device, which is simple and convenient to assemble.

For example, a material of the adhesive 200 may comprise an organic adhesive or an inorganic adhesive. The organic adhesive may be, for example, a thermosetting resin, a thermoplastic resin, a synthetic rubber, a composite rubber, or the like.

For example, the electronic device may comprise a plurality of sound transmission channels 101. As shown in FIG. 7, in an example, the electronic device may be provided with three sound transmission channels 101. A first port 1011 of each of the plurality of sound transmission channels 101 meets the input/output interface jack 1033 of the data input/output interface module 103, and a second port 1012 of each of the plurality of sound transmission channels 101 meets the microphone module 102, so as to implement sound receipt by a relatively large area and improve the sound-receiving quality of the microphone module 102. For example, the electronic device may be provided with a plurality of microphone modules 102, and the plurality of microphone modules 102 may be respectively connected with the plurality of sound transmission channels 101. For example, the electronic device may be provided with three microphone modules 102, and the three microphone modules 102 are connected with the three sound transmission channels 101 in one-to-one correspondence.

It should be noted that, the electronic device can enhance the sound-receiving quality of the microphone by using a multi-microphone noise reduction approach. The multi-microphone noise reduction approach comprises: collecting human voice through one microphone, and collecting environment noise through another microphone; and then inside the electronic device, performing digital signal processing (DSP) on the collected environment noise, so as to achieve sound phase inversion and form a sound wave that is opposite to the environment noise; and finally combining the sound wave with the collected human voice to achieve a function of counteracting the noise. When performing the multi-microphone noise reduction, if the microphone for collecting the environment noise and the microphone for collecting the human voice are too close, the collected environment noise and the collected human voice can not be distinguished, so that the noise reduction can not be achieved. In order to achieve multi-microphone noise reduction, the electronic device may be provided with a plurality of microphone modules 102, and the plurality of microphone modules 102 may be located at different positions of the electronic device and are in one-to-one correspondence with the data input/output interface modules 103. For example, the electronic device comprises two data input/output interface modules 103, two microphone modules 102 and two sound transmission channels 101. The two data input/output interface modules 103 are located on a left side and a right side (or an upper side and a down side) of the electronic device that are far away from each other. The two sound transmission channels 101 correspond to the two data input/output interface modules 103 respectively. The two microphone modules 102 can receive sound through the two sound transmission channels 101 respectively, so as to achieve multi-microphone noise reduction.

The electronic device provided by the embodiments of the present disclosure can omit a process of producing a sound transmission channel separately on a casing of the electronic device, improve appearance aesthetics of the electronic device, simplify the manufacturing process and reduce the production cost.

For the present disclosure, the following statements should be noted:

(1) the accompanying drawings involve only the structure(s) in connection with the embodiment(s) of the present disclosure, and other structure(s) can be referred to in common design(s);

(2) for the purpose of clarity only, in accompanying drawings for illustrating the embodiment(s) of the present disclosure, the thickness a layer or area may be enlarged or narrowed, that is, the drawings are not drawn in a real scale; and it is to be understood that, when a member such as a layer, a film, an area or a substrate is located or disposed on or below another member, the member can be located or disposed on or below the another member directly, or an intermediate member or intermediate member(s) can be disposed; and (3) in case of no conflict, the embodiments of the present disclosure and the features in the embodiment(s) can be combined with each other to obtain new embodiment(s).

What have been described above are only specific implementations of the present disclosure, the protection scope of the present disclosure is not limited thereto, and the protection scope of the present disclosure should be based on the protection scope of the claims.

What is claimed is:

1. An electronic device, comprising:
 a microphone module;
 at least one data input/output interface module, comprising an input/output interface jack; and
 at least one sound transmission channel, comprising a first port and a second port,
 wherein the first port meets the input/output interface jack, and the second port meets the microphone module, and
 wherein the at least one data input/output interface module includes a plurality of data input/output interface modules, the at least one sound transmission channel includes a plurality of sound transmission channels which are in one-to-one correspondence with the plurality of data input/output interface modules, and an input/output interface jack of each of the plurality of data input/output interface modules meets the microphone module through a corresponding sound transmission channel.

2. The electronic device according to claim 1, wherein the at least one data input/output interface module further comprises a plastic part, and the at least one sound transmission channel is located in the plastic part.

3. The electronic device according to claim 1, wherein the first port is disposed on a side wall of the input/output interface jack.

4. The electronic device according to claim 1, wherein the at least one data input/output interface module further comprises a conductive-shielding shell, the conductive-shielding shell comprises an opening, and the input/output interface jack meets the microphone module through the opening and the at least one sound transmission channel.

5. The electronic device according to claim 1, wherein a shape of the at least one sound transmission channel comprises a cylindrical shape or a horn shape.

6. The electronic device according to claim 1, wherein the at least one data input/output interface module comprises a universal serial bus module, a high definition multimedia interface module, a digital video interface module, a thunderbolt interface module, a card reader module, or a high-definition digital display interface module.

7. The electronic device according to claim 1, wherein a first port of each of the plurality of sound transmission channels meets a corresponding input/output interface jack, and a second port of each of the plurality of sound transmission channels meets the microphone module.

8. The electronic device according to claim 1, wherein the at least one sound transmission channel extends in a direction perpendicular or oblique to the input/output interface jack.

9. The electronic device according to claim 1, wherein a diameter range of a cross section of the at least one sound transmission channel is 1-2 mm.

10. The electronic device according to claim 1, wherein a length of the at least one sound transmission channel is 1-2 mm.

11. The electronic device according to claim 1, wherein the microphone module comprises an electret condenser microphone or a micro electro mechanical system microphone.

12. An electronic device, comprising:
 a microphone module;
 at least one data input/output interface module, comprising an input/output interface jack; and
 at least one sound transmission channel, comprising a first port and a second port,
 wherein the first port meets the input/output interface jack, and the second port meets the microphone module, and
 wherein the at least one data input/output interface module further comprises a plastic part, and the at least one sound transmission channel is located in the plastic part, and
 wherein the at least one sound transmission channel includes a plurality of sound transmission channels, a first port of each of the plurality of sound transmission channels meets the input/output interface jack, and a second port of each of the plurality of sound transmission channels meets the microphone module.

13. The electronic device according to claim 12, wherein the first port of the at least one sound transmission channel is disposed on a side wall of the input/output interface jack.

14. The electronic device according to claim 12, wherein the at least one data input/output interface module includes a plurality of data input/output interface modules, wherein the plurality of sound transmission channels are in one-to-one correspondence with the plurality of data input/output interface modules, and an input/output interface jack of each of the plurality of data input/output interface modules meets the microphone module through a corresponding sound transmission channel.

15. The electronic device according to claim 12, wherein the at least one data input/output interface module further comprises a conductive-shielding shell, the conductive-shielding shell comprises an opening, and the input/output interface jack meets the microphone module through the opening and the at least one sound transmission channel.

16. The electronic device according to claim 12, wherein a shape of the at least one sound transmission channel comprises a cylindrical shape or a horn shape.

17. The electronic device according to claim 12, wherein the at least one data input/output interface module comprises a universal serial bus module, a high definition multimedia interface module, a digital video interface module, a thunderbolt interface module, a card reader module, or a high-definition digital display interface module.

18. The electronic device according to claim 12, wherein the at least one sound transmission channel extends in a direction perpendicular or oblique to the input/output interface jack.

19. The electronic device according to claim 12, wherein a diameter range of a cross section of the at least one sound transmission channel is 1-2 mm.

* * * * *